US012365197B2

(12) United States Patent
Berberich et al.

(10) Patent No.: US 12,365,197 B2
(45) Date of Patent: Jul. 22, 2025

(54) WRITING INSTRUMENT

(71) Applicant: C. JOSEF LAMY GMBH, Heidelberg (DE)

(72) Inventors: Wilhelm Berberich, Krautheim (DE); André Hertwig, Erlbach (DE)

(73) Assignee: C. JOSEF LAMY GMBH, Heidelberg (DE)

( * ) Notice: Subject to any disclaimer, the term of this patent is extended or adjusted under 35 U.S.C. 154(b) by 0 days.

(21) Appl. No.: 18/513,870

(22) Filed: Nov. 20, 2023

(65) Prior Publication Data

US 2024/0174020 A1 May 30, 2024

(30) Foreign Application Priority Data

Nov. 30, 2022 (DE) ..................... 10 2022 131 776.5

(51) Int. Cl.

| | |
|---|---|
| ***B43K 8/14*** | (2006.01) |
| ***B43K 5/06*** | (2006.01) |
| ***B43K 11/00*** | (2006.01) |

(52) U.S. Cl.

CPC .............. *B43K 8/143* (2013.01); *B43K 8/146* (2013.01); *B43K 5/06* (2013.01); *B43K 11/005* (2013.01)

(58) Field of Classification Search

CPC ........ B43K 8/143; B43K 8/146; B43K 11/00; B43K 11/005; B43K 5/06; B43K 5/08; B43K 5/18; B43K 5/1818

USPC ........................... 401/13, 171, 172, 174, 222

See application file for complete search history.

(56) References Cited

U.S. PATENT DOCUMENTS

| | | | | |
|---|---|---|---|---|
| 2,148,236 A * | 2/1939 | Hanle | B43K 5/06 | 277/436 |
| 6,250,832 B1 * | 6/2001 | Del Vecchio | B43K 5/10 | 401/230 |
| 8,092,108 B2 * | 1/2012 | Bainbridge | B05C 17/00516 | 401/179 |

FOREIGN PATENT DOCUMENTS

| | | |
|---|---|---|
| DE | 682 285 C | 10/1939 |
| DE | 1 736 933 U | 12/1956 |
| DE | 1 461 284 A1 | 3/1972 |
| DE | 2 300 908 A1 | 7/1974 |

* cited by examiner

*Primary Examiner* — David J Walczak

(74) *Attorney, Agent, or Firm* — Oliff PLC

(57) ABSTRACT

A writing instrument with an operating side, with a writing side with a nib, with a tank which can be filled with liquid writing medium, with a piston, which is movable within the tank, and with an operating element arranged on the operating side for axial adjustment of the piston within the tank. The writing instrument is characterized in that the operating element can be brought by a user from a first axial position, namely an idle position, in which it is held axially in position in particular with locking, into a second axial position which differs axially from the idle position, namely an operating position, in which the operating element has a larger distance to the nib in comparison with the idle position and in which the operating element can be gripped by the user and moved for the axial adjustment of the piston.

18 Claims, 3 Drawing Sheets

WRITING INSTRUMENT

Figures 1, 2, 3:
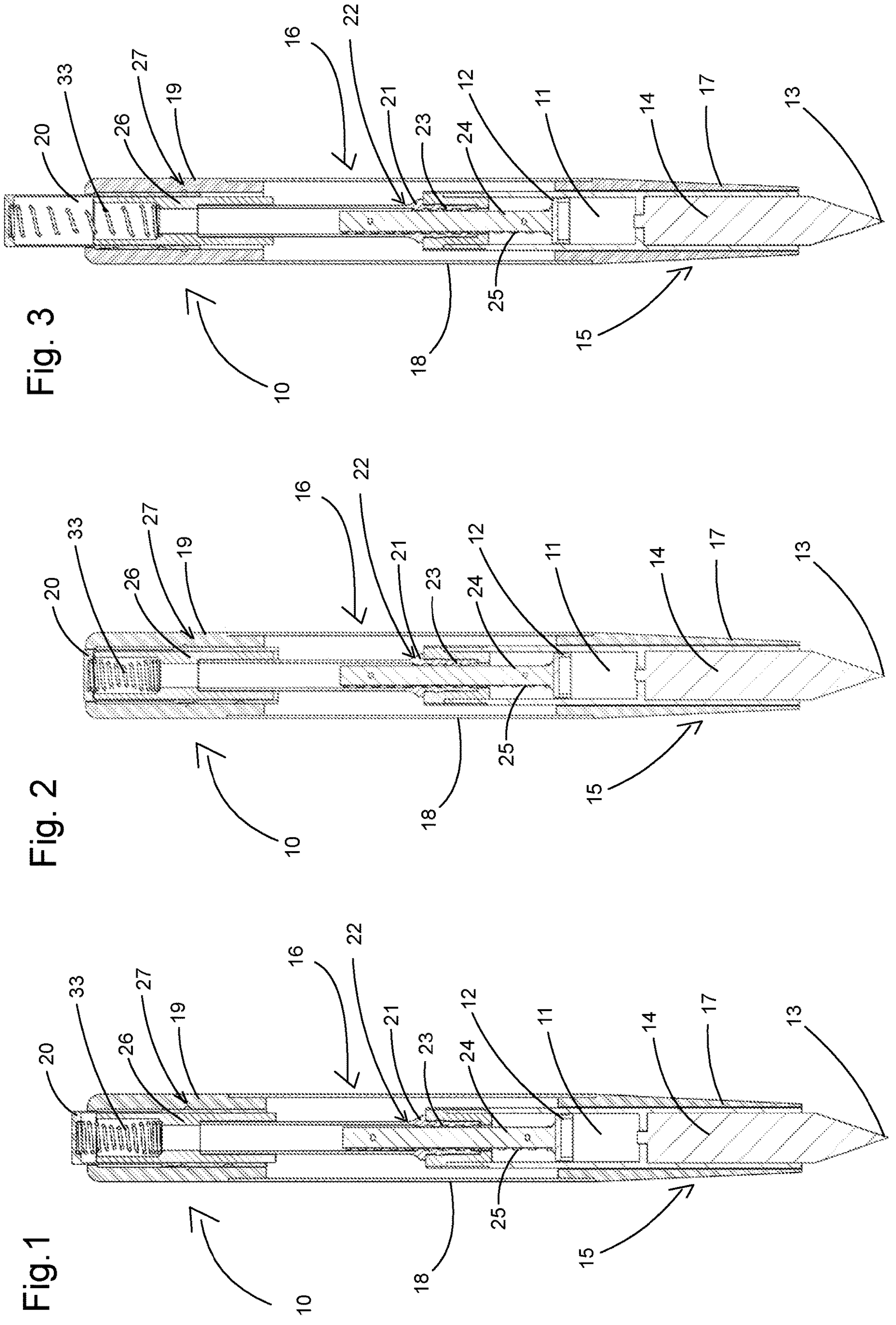

The present invention relates to a writing instrument with an operating side, with a writing side with a nib, with a tank which can be filled with liquid writing medium, with a piston, which is movable within the tank in particular to fill the tank, and with an operating element arranged on the operating side for axial adjustment of the piston within the tank.

Various mechanisms and mechanical systems are known in order to fill the tanks of such writing instruments with ink. For example, in the case of fountain pens with so-called converters, a rear housing part of the fountain pen must generally be first detached from a front housing part in order to be able to access the converter and in order then to be able to move the piston located in the tank for drawing up the ink backward by rotating the rotary knob of the converter. This is complicated.

In the case of writing instruments with a fixedly installed tank, it is known, among other things, to arrange a rotary knob on the rear part of the writing instrument or on the operating side, which rotary knob is rotatable relative to the front housing part. The piston connected to the rotary knob can then be suitably moved by corresponding rotational movements of the rotary knob by a user. In this case, it is, among other things, disadvantageous that the rotary knob codetermines in each case the longitudinal dimensions of the writing instrument and the compact nature of the writing instrument is correspondingly limited.

Proceeding from this, the object of the present invention is to further develop the above-mentioned writing instrument.

This object is achieved by a writing instrument with the features of claim 1.

A writing instrument according to the invention is correspondingly characterized in that the operating element can be brought by a user from a first axial position, namely an idle position, in which it is held axially in position in particular with locking of the operating element, into a second axial position which differs axially from the idle position, namely an operating position, in which the operating element has a larger distance to the nib in comparison with the idle position and in which the operating element can be gripped by the user and moved for the axial adjustment of the piston.

As a result of the solution according to the invention, it is made possible, among other things, to transfer the writing instrument into a significantly more compact or shorter idle state, in which it is located closer to the writing side, in comparison with the known writing instruments with a piston which is movable in a tank, in those phases in which the writing instrument filled sufficiently with writing medium does not have to be filled; for example, at least partially retracted in an interior of the writing instrument. It is only in the operating phases in which the tank should be filled that the writing instrument would then have to be "lengthened" for a short period of time in that the operating element would only be moved temporarily for the filling of the tank into the operating position positioned further away from the writing side.

According to one particularly preferred embodiment of the invention, the operating element can be a push button which can be moved by a user by actuation thereof, namely by application of compressive forces on it, firstly from the idle position in the direction of the writing side, and which thereafter can be moved or is moved into the operating position in particular by spring forces of a spring element of the writing instrument (in particular automatically) in the opposite direction.

It can preferably be provided that the operating element for axial adjustment of the piston is formed rotatably and coupled in particular to the piston so that at least in the operating position a rotation of the operating element leads to the axial adjustment of the piston in the tank.

In particular, but not only in the case of the above-mentioned embodiment, it is particularly advantageous if the operating element in the idle position is immersed largely and in particular so far into the interior of the writing instrument that the user cannot grip it or only with difficulty.

This on one hand to be able to configure the writing instrument in a particularly compact manner. On the other hand, however, possibly also to avoid any possible accidental incorrect operation in particular in the case of the above-mentioned embodiment; for example, in the event that even in the idle position the operating element is coupled to the piston and for this reason unintentional rotational movements thereof even in the idle position would then lead to unintentional axial adjustment movements of the piston.

In this context, the operating element in the idle position, in particular for this purpose, can be immersed at least partially (preferably largely), in particular axially over at least ¾ of its length, particularly preferably axially over at least 9/10 of its length, into an interior, preferably formed by the housing of the writing instrument, of the writing instrument, while another or the remaining part of the operating element in the idle position protrudes (only slightly) out of the writing instrument; for example, axially less than 7 mm of the operating element, preferably less than 5 mm, particularly preferably less than 3 mm.

It can furthermore also be provided that the operating element in the operating position is immersed partially in a or the above-mentioned interior of the writing instrument preferably formed by the housing of the writing instrument, while the remaining (in particular larger/longer) part of the operating element, in particular to enable actuation thereof which is as comfortable as possible in the operating position, protrudes axially out of the writing instrument, in particular axially more than 3 mm of the operating element, preferably more than 5 mm, particularly preferably more than 7 mm.

It can furthermore be provided that the operating element, in the operating position, preferably also in the idle position, is operatively connected in a rotationally fixed manner to a first spindle body, which also rotates in particular during rotation of the operating element, of a spindle arrangement, which interacts with the piston, the spindle arrangement being formed in such a manner that a rotation of the first spindle body brings about an or the axial movement of the piston for adjustment thereof.

The spindle arrangement can have a second spindle body, connected in particular integrally to the piston, having a thread which engages in a corresponding thread of the first spindle body which is operatively connected in a rotationally fixed manner to the operating element.

In a further specification of this embodiment, the first spindle body can be, for example, a sleeve with an internal thread or a threaded spindle connected in particular integrally to the piston with an external thread.

The second spindle body can in turn be a threaded spindle with an external thread or a sleeve, in particular fixed on the housing, with an internal thread.

The operating element can furthermore preferably be mounted axially displaceably relative to the piston so that the piston is not also axially moved in the case of (the) axial movements of the operating element between the idle position and the operating position.

This is advantageous in particular, but not only in the context of an embodiment, cf. above, in the case of which rotations of the operating element lead to the axial movements of the piston. This is because in this manner additional undesirable axial movements of the piston can be avoided during those axial movements of the operating element which are necessary for the transfer of the operating element from the idle position into the operating position (and vice versa).

In order to implement the concept according to the invention, the writing instrument particularly preferably has a control unit which interacts with the operating element and is formed in such a manner that the operating element can be unlocked starting from its idle position, in which it is locked, by actuating the operating element. Wherein it can preferably be provided that it subsequently, i.e. after unlocking, can be moved or is moved into the operating position by the spring force of the spring element (in particular automatically).

Alternatively or additionally, the control unit can also be formed in such a manner that the operating element can be moved into the idle position starting from the operating position by actuating the operating element and can be locked in the idle position.

The control unit can have a first locking means, in particular a ball or a pin, which, in the idle position of the operating element, for locking of the operating element, interacts with a second locking means. For example, with a locking portion of a switch curve of the control unit with which the first locking means interacts preferably with engagement therein or with an in particular annular guide channel, such as an annular groove, into which the first locking means engages.

The first locking means can furthermore be mounted in an axially fixed manner, i.e. without the possibility of movement in the axial direction. For example, by engagement in a preferably annular guide channel, such as, for example, an annular groove, which runs preferably in a transverse-axial plane. Or also by arrangement or use of one or more preferably annular stop surfaces which are arranged or mounted in particular in an axially fixed manner.

The switch curve can furthermore preferably have in particular a heart-shaped region and be movable in particular relative to the first locking means.

The switch curve can furthermore be connected to the operating element in a rotationally and axially fixed manner, therefore both without the possibility of rotation relative to the operating element and without an axial possibility of movement relative to the operating element.

The switch curve can be in particular a component of the operating element. It can, among other things, be arranged on the outside thereof or also fixed on the housing, i.e. without the possibility of movement relative to the housing of the writing instrument. It can thus be arranged, for example, on an inside of a housing wall of the writing instrument housing.

It can furthermore be provided that the switch curve is arranged on the outside of the operating element and has a switch curve portion which adjoins in particular the heart-shaped region and is connected thereto, in which switch curve portion one end of a connecting channel is located which connects the outside of the operating element to an inside thereof which delimits an interior of the operating element and the dimensions of which are formed in such a manner that the ball can be moved from the inside to the outside by it during assembly of the writing instrument.

The end of the connecting channel can be arranged in a sub-portion of the switch curve portion, toward which the ball cannot be moved by actuating the operating element of the (assembled) writing instrument.

The operating element can be guided in the housing of the writing instrument furthermore axially by at least one guide, in particular by a guide which has an axial guide channel such as a guide groove and a guide part which fits in particular in terms of the dimensions and which engages into the axial guide channel.

The axial guide channel could be connected to the operating element in a rotationally and axially fixed manner or be a component of the operating element, while the guide part can be arranged in an axially fixed manner in the housing of the writing instrument.

Alternatively, the guide part could be connected to the operating element in a rotationally and axially fixed manner or be a component thereof and the axial guide channel could be arranged in an axially fixed manner in the housing of the writing instrument.

In particular, the axial guide channel or the guide part can be a component of a driver component formed as a sleeve. For example, of a driver component which is formed as a sleeve, sits externally on the first spindle body formed as a sleeve and is connected thereto in particular in a rotationally and axially fixed manner.

By way of precaution, it should be pointed out here that, according to the concept according to the invention, in addition to the push button mentioned further above, various other variants of operating elements for adjustment of the piston as well as potentially of control units which interact with the operating elements are conceivable insofar as the respective operating element can be moved in the above-mentioned manner between a first axial position or idle position (in which it can preferably also be locked) and a second axial position or operating position which is further away from the writing side.

For example, among other things, a variant is conceivable in the case of which the operating element is transferred from the idle position into the operating position by a user by gripping and pulling on the operating element in the direction of the operating side; in the case of which the operating element is therefore (at least partially) pulled, for example, out of the interior, into which it is possibly (partially/largely) immersed, by the user.

In the case of this solution, the control unit could have, for (axial) locking of the operating element in the idle position, for example, as a second locking means, an in particular annular groove or an in particular annular guide channel in which a spring-mounted ball engages as a first locking means (snap mechanism), this spring force having to be overcome by a user when pulling out the operating element.

Solutions are also conceivable in the case of which the control unit comprises a bayonet closure for axially securing and for axially locking the operating element in the idle position.

Solutions are also conceivable in which the control unit comprises a shifting collar, as is known, for example, among other things from ballpoint pens having in each case a push button. In other words, the operating element could in this case be transferred from the idle position into the operating position or vice versa from the operating position into the idle position using a control unit having a shifting collar and possibly also be locked in the idle position.

Further features of the present invention will become apparent from the attached claims, the following description of further preferred exemplary embodiments and from the attached drawings. It will be obvious that the following exemplary embodiments primarily serve to explain selected aspects of the invention, but otherwise do not in any way restrict the subject matter of the application.

Figure 4:
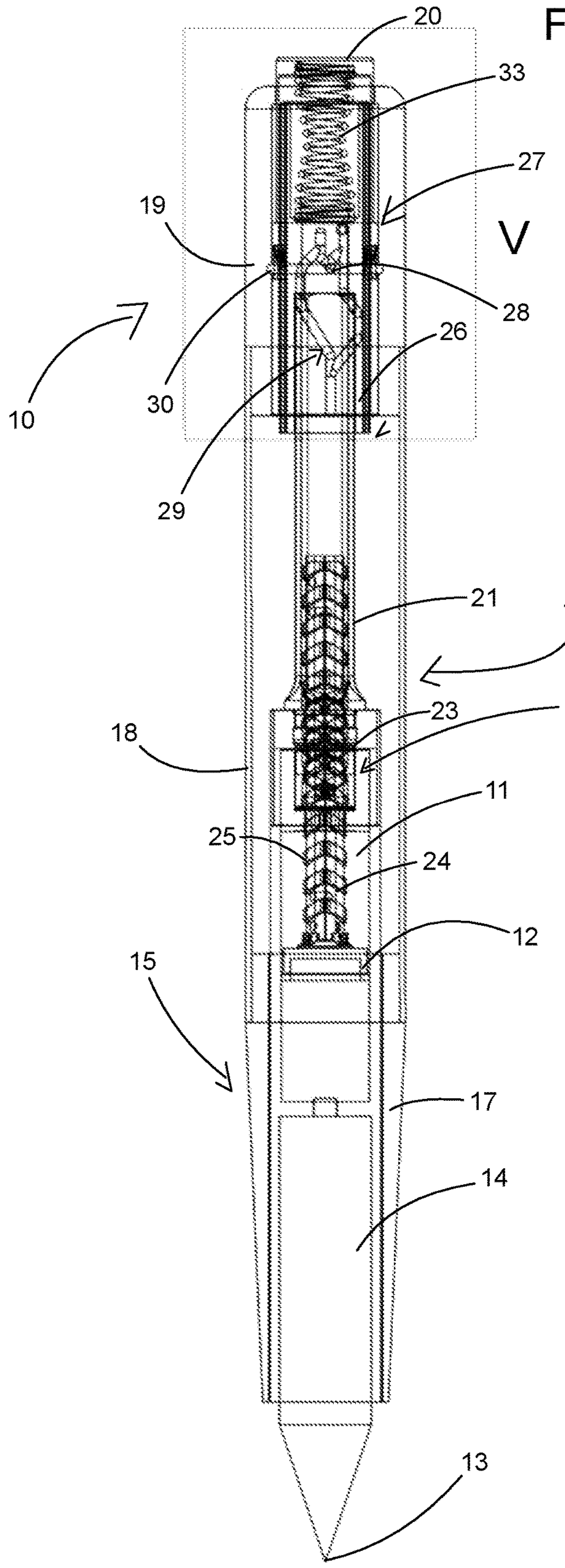
Figure 5:
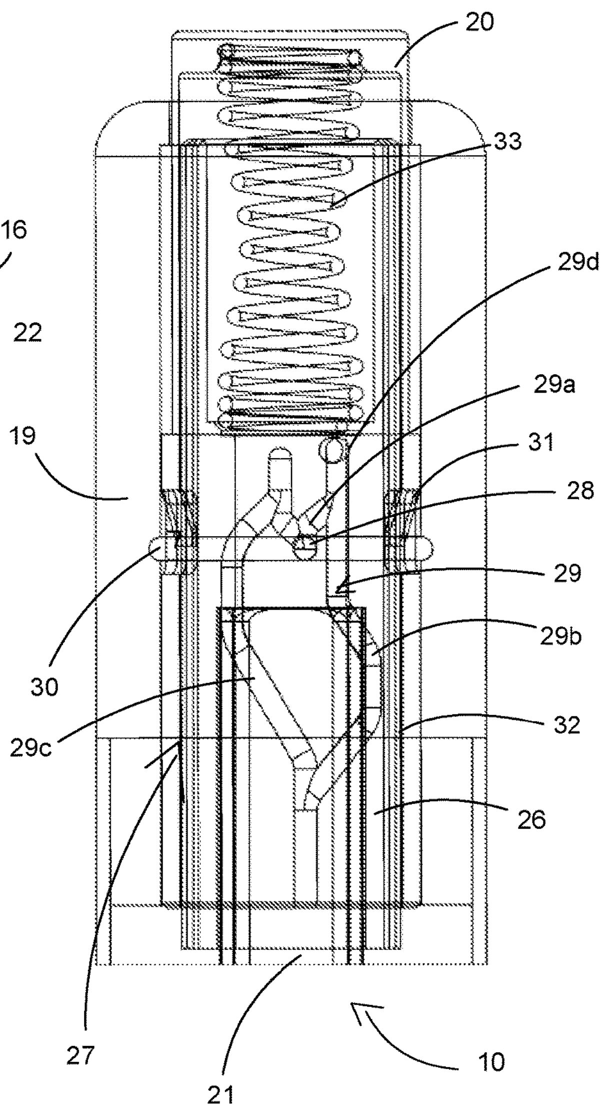
Figure 6:
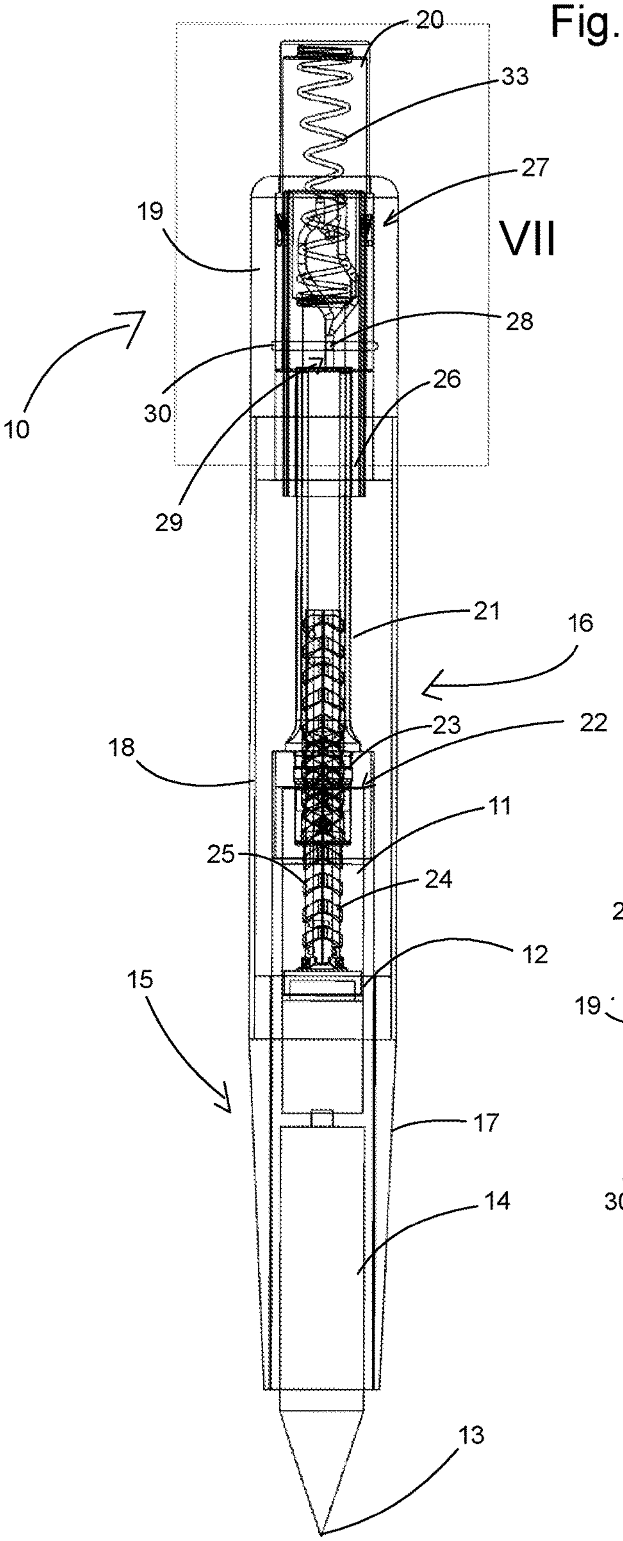
Figure 7:
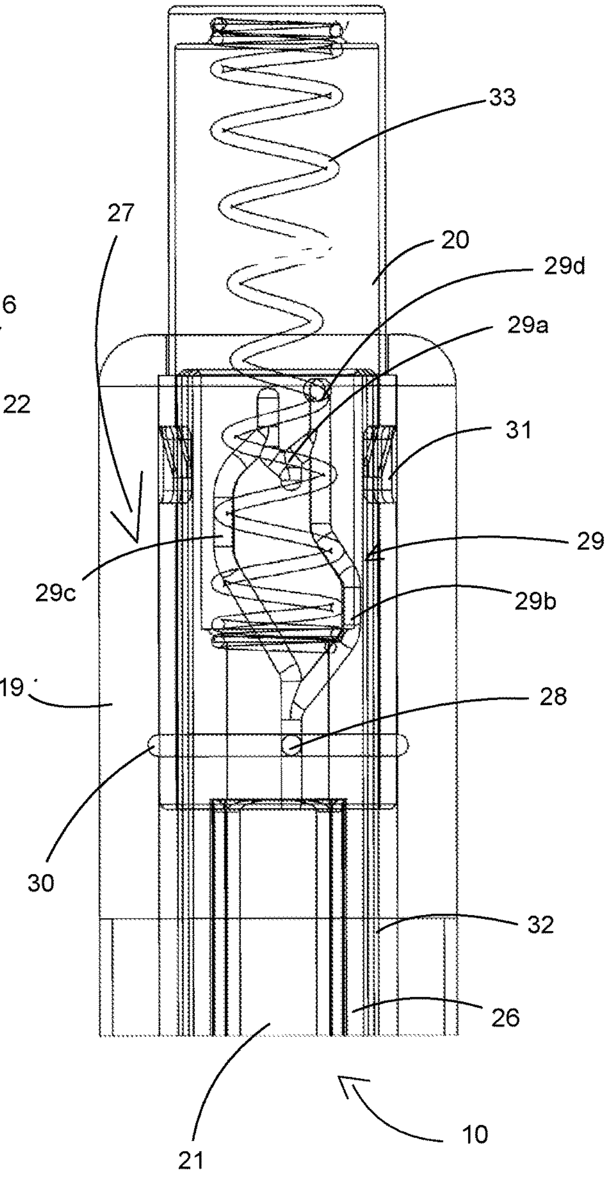

In the drawings:

FIG. 1 shows a writing instrument according to the invention in a longitudinal section with an operating element located in an idle position for movement of the piston of the writing instrument, FIG. 2 shows the writing instrument from FIG. 1, the operating element being located in an overstroke position, immediately after application of a compressive force on the operating element by an operator, FIG. 3 shows the writing instrument from FIG. 1, the operating element being located in an operating position, FIG. 4 shows the writing instrument in the state according to FIG. 1, but in a longitudinal section rotated by 90°, FIG. 5 shows an enlarged representation of the region V in FIG. 4, FIG. 6 shows the writing instrument in the state according to FIG. 3, but in a longitudinal section rotated by 90°, FIG. 7 shows an enlarged representation of the region VII in FIG. 6.

The drawings show by way of example as a writing instrument 10 according to the invention a piston fountain pen, which is partially only schematically represented, with a tank 11 fixedly integrated therein and a piston 12 arranged longitudinally-axially displaceably therein.

It will be obvious that the invention is not restricted to such writing instruments. On the contrary, the invention encompasses all types of writing instruments which have a tank with a piston with or for writing medium, such as ink or other liquids which are used for writing.

The tank 11 furthermore of course does not have to be installed fixedly in the writing instrument 10 as in the case of so-called piston fountain pens. On the contrary, it could also be removable, possibly together with other components of the writing instrument 10, as is the case, for example, with so-called converter fountain pens.

The writing instrument 10 represented in the drawings comprises at its writing side or at its front end a nib 13 which is formed in the present case, for example, by the tip of a pen.

The nib 13 forms the front end of a writing unit 14, otherwise only represented schematically, of the writing instrument 10 which is in turn part of a writing part 15 of the writing instrument 10 which has, in addition to the writing unit 14, a front (outer) housing part 17 of a multi-part housing 16 of the writing instrument 10 which serves as a grip and is or can be correspondingly gripped by a user during writing.

The writing unit 14 is supplied with liquid writing medium, in the present case ink, which is located in the tank 11. The writing medium is conducted in a familiar manner via ink-conducting channels, etc. of the writing unit 14 to the nib 13 of the pen. According to the invention, the precise formation of the writing unit 14 is not important.

The liquid writing medium is, before the writing instrument 10 can be used for writing, brought in the course of a filling process from an external container, into which the nib 13 is dipped during the filling process, by means of a vacuum into the tank 11.

For this purpose, the writing instrument 10 has at its rear end or at its operating side, as an elongation of a central housing part 18 of the housing 16, a rear housing part 19 in which an operating element 20 is arranged or mounted in an axially movable manner. The operating element 20 serves in general terms to be able to move the piston 12 inside the tank 11 in a suitable manner from front to rear or from the writing side to the operating side during filling of the tank 11 in order to thus be able to generate the corresponding vacuum in the tank 11 which then leads in a familiar manner to the writing medium flowing via the nib 13 or the writing unit 14 into the tank 11.

In the present case, the operating element 20 is formed as a push button which can be pushed in the direction of the writing side by a user from a first axial position shown in FIG. 1, in which the operating element 20 is axially held with locking and is partially immersed into the interior of the housing 16 or in the present case of the rear housing part 19, cf. the position of the operating element 20 in FIG. 2.

As soon as the user lets go of the operating element 20 or no longer applies any compressive forces in the direction of the writing side, the forces of a spring element 33 which is supported in the rear housing part 19 ensure that the operating element 20 is moved into a second axial position, in which the (axial) distance of the operating element 20 from the writing side or from the nib 13 is larger than in its first axial position.

The first axial position corresponds to an idle position of the operating element 20, in which the operating element 20 is immersed so far into the housing 16 or the rear housing part 19 that the still protruding part thereof is so short that the operating element 20 in the present case cannot be gripped by a user or only with great difficulty such that accidental operating errors are largely ruled out. The operating element 20 in its idle position is preferably immersed at least over ¾ of its length into the corresponding interior of the rear building part 19. Less than 3 mm of the operating element 20 likewise preferably protrudes axially out of the rear housing part 19.

In contrast, the second axial position corresponds to an operating position of the operating element 20 in which the operating element 20 protrudes so far out of the rear housing part 19 that a user can comfortably grip and operate it in order to be able to correspondingly comfortably move the piston 12 axially in the tank 11 by movement thereof.

More than 5 mm of the operating element 20 preferably protrudes axially out of the rear housing part 19.

It will be obvious that other advantageous dimensions or length ratios are also conceivable, cf. in particular the introduction to the description.

In the present exemplary embodiment, the operating element 20 is formed to be rotatable and is connected in a rotationally fixed manner to a first spindle body 21 of a spindle arrangement 22 both in the idle position and in the operating position, and indeed via a sleeve-like drive component 26 which is connected to the first spindle body 21 in a rotationally and axially fixed manner.

It will, however, be obvious that it is not essential that the operating element 20 is connected in a rotationally fixed manner to the first spindle body 21 even in the idle position. Solutions are also conceivable in the case of which the rotationally fixed connection is only ensured in the operating position. For example, when using a suitable coupling between operating element 20 and first spindle body 21 which produces a rotationally fixed connection only in the operating position, but not in the idle position.

The operating element 20 in turn is on one hand connected in a rotationally fixed manner to the driver component 26, on the other hand, however, mounted longitudinally displaceably thereon such that the axial movements of the operating element 20 relative to the driver component 26 do not lead to axial movements of the driver component 26 and correspondingly also not to axial movements of the first spindle body 21.

This in the present case in that in each case one of two guide parts 31 of the operating element 20 are arranged or mounted longitudinally displaceably, but in a rotationally fixed manner in in each case one of two assigned axial guide channels 32 (in the present case a guide groove) which fits the transverse dimensions of the respective guide part 31, namely having only slightly wider or only slightly larger transverse dimensions.

The first spindle body 21 is formed in the present case as a sleeve with an internal thread 23 which interacts with the external thread 25 of a second spindle body 24 of the spindle arrangement 22, namely in the present case of a threaded spindle. In this case, a rotation of the first spindle body brings about an axial movement of the piston 12, and indeed depending on the direction of rotation either to the rear, i.e. to the operating side, or in the opposite direction forward, i.e. to the writing side.

The writing instrument 10 furthermore has a control unit 27 which ensures among other things that the operating element 20 in the idle position is held axially in position or is correspondingly axially locked in this position.

For this purpose, the control unit 27 comprises in the present case among other things a first locking means, namely a ball 28, which interacts with a second locking means, namely a locking portion 29*a* of a switch curve 29 of the control unit 27, in which the ball 28 is guided or into which the ball 28 engages.

The ball 28 is mounted in an axially fixed manner in a transverse-axial plane, namely in an annular guide channel fixed on the housing, namely an annular groove 30 in the rear housing part 19 in which it can move circumferentially.

In the present exemplary embodiment, the switch curve 29 of the control unit 27 is a component of the operating element 20, on the outside of which this is arranged. It will, however, be obvious that there are various other variants to arrange such a switch curve 29 in the writing instrument 10. Among other things, it could also be arranged fixed on the housing, for example, on the inside of the rear housing part 19 or on one side of a separate sleeve or the like.

The switch curve 29 is formed to be substantially heart-shaped or has a heart-shaped region, wherein the locking portion 29*a* forms a sub-portion thereof. The ball 28 comes to lie in this locking portion 29*a*, while the operating element 20 is located in the idle position, cf. FIGS. 4 and 5.

The locking portion 29*a* interacts with the ball 28 in such a manner that a pressure actuation of the operating element 20 and a transfer brought about as a result of this of the operating element into the operating element position shown in FIG. 2 releases the locking or enables an unlocking of the operating element 20. In this case, the ball 28 moves out of the locking portion 29*a* and is guided along a or the switch curve portion 29*b* which accompanies the unlocking and enables the axial movement described above of the operating element 20 into the extended position or the operating position, cf. FIG. 3 in which the rotational movements for the axial adjustment of the piston 12 can then be performed in a comfortable manner.

If the operating element 20 in the operating position of FIG. 3 is once again pressure-actuated by the operator after filling of the piston, i.e. is acted upon with pressure in the direction of the writing side, the ball 28 is guided along the switch curve portion 29*c*, which then as a result transfers the ball 28 back into the locking portion 29*a* and correspondingly locks the operating element again, cf. FIG. 1.

Yet another switch curve portion 29*d* is apparent from FIGS. 4 and 5 which is linked to or adjoins the heart-shaped region and is connected thereto. There is located in the switch curve portion 29*d* an end of a connecting channel, not shown, which connects the outside of the operating element 20 to an inside thereof which delimits the interior of the operating element 20 and the dimensions of which are formed in such a manner that the ball 28 can be moved from the inside to the outside by it during assembly of the writing instrument 10.

The switch curve portion 29*d* is positioned so that the ball 28 cannot be moved by actuation of the operating element 20 of the (assembled) writing instrument 10 toward it, but rather the ball 28 is moved by it only once during the assembly of the writing instrument 10. As a result of this, the ball 28 is prevented from accidentally reaching the inside of the operating element 20 during operation of the writing instrument 10 through the connecting channel, as a result of which the control unit 27 would become inoperative.

LIST OF REFERENCE NUMBERS

10 Writing instrument
11 Tank
12 Piston
13 Nib
14 Writing unit
15 Writing part
16 Housing
17 Front housing part
18 Central housing part
19 Rear housing part
20 Operating element
21 First spindle body
22 Spindle arrangement
23 Internal thread first spindle body
24 Second spindle body
25 External thread
26 Driver component
27 Control unit
28 Ball
29 Switch curve
29*a* Locking portion
29*b* Switch curve portion
29*c* Switch curve portion
29*d* Switch curve portion
30 Annular guide channel
31 Guide parts

The invention claimed is:

1. A writing instrument with an operating side, with a writing side with a nib, with a tank which can be filled with liquid writing medium, with a piston, which is movable within the tank, and with an operating element arranged on the operating side for axial adjustment of the piston within the tank, wherein the operating element can be brought by a user from a first axial position, which is an idle position, in which the operating element is held axially in position with locking, into a second axial position which differs axially from the idle position, which is an operating position, in which the operating element has a larger distance to the nib in comparison with the idle position and in which the operating element can be gripped by the user and moved for the axial adjustment of the piston, wherein the writing instrument has a control unit which interacts with the operating element and is formed so that the operating element can be unlocked starting from the idle position, in which the operating element is axially locked, by actuating the operating element, and/or is formed so that the operating element can be moved into the idle position starting from the operating position by actuating the operating element and can be locked in the idle position, the control unit has a first locking means, which, in the idle position of the operating element, for locking of the operating element, interacts with a second locking means, and the second locking means is formed as a locking portion of a switch curve of the control unit with which the first locking means interacts with engagement therein or is formed as a guide channel into which the first locking means engages.

2. The writing instrument as claimed in claim 1, wherein the operating element is a push button which can be moved by a user by actuation thereof, by application of compressive forces on the operating element, firstly from the idle position in the direction of the writing side, and which thereafter can be moved or is moved into the operating position by spring forces of a spring element of the writing instrument in the opposite direction.

3. The writing instrument as claimed in claim 1, wherein the operating element is immersed at least partially into an interior of the writing instrument, while another or a remaining part of the operating element in the idle position protrudes out of the writing instrument.

4. The writing instrument as claimed in claim 1, wherein the operating element in the operating position is immersed partially in an interior of the writing instrument, while a remaining part of the operating element protrudes out of the writing instrument.

5. The writing instrument as claimed in claim 1, wherein the operating element is formed rotatably for axial adjustment of the piston and is operatively connected in a rotationally fixed manner to a first spindle body of a spindle arrangement, which interacts with the piston, and the spindle arrangement is formed in such a manner that a rotation of the first spindle body brings about an axial movement of the piston.

6. The writing instrument as claimed in claim 5, wherein the spindle arrangement has a second spindle body, having a thread which engages in a corresponding thread of the first spindle body which is operatively connected in a rotationally fixed manner to the operating element.

7. The writing instrument as claimed in claim 6, wherein the second spindle body is a threaded spindle with an external thread or a sleeve with an internal thread.

8. The writing instrument as claimed in claim 5, wherein the first spindle body is a sleeve with an internal thread or a threaded spindle connected integrally to the piston with an external thread.

9. The writing instrument as claimed in claim 1, wherein the operating element is mounted axially displaceably relative to the piston so that the piston is not also axially moved in the case of axial movements of the operating element between the idle position and the operating position.

10. The writing instrument as claimed in claim 1, wherein the switch curve having a heart-shaped region is movable relative to the first locking means.

11. The writing instrument as claimed in claim 10, wherein the switch curve is arranged on an outside of the operating element and has a switch curve portion which adjoins the heart-shaped region and is connected thereto, one end of a connecting channel is located in the switch curve portion and which connects the outside of the operating element to an inside thereof which delimits an interior of the operating element and dimensions of which are formed so that the locking means, which is a ball, can be moved from inside of the operating element to the outside of the operating element by the switch curve portion during assembly of the writing instrument.

12. The writing instrument as claimed in claim 11, wherein the end of the connecting channel is arranged in a sub-portion of the switch curve portion, toward which the ball cannot be moved by the relative movement by actuating the operating element of the writing instrument.

13. The writing instrument as claimed in claim 1, wherein the first locking means is mounted in an axially fixed manner.

14. The writing instrument as claimed in claim 1, wherein the switch curve is connected to the operating element in a rotationally and axially fixed manner and/or is a component of the operating element or the switch curve is arranged fixed on a housing.

15. The writing instrument as claimed in claim 1, wherein the operating element is guided in a housing of the writing instrument axially by at least one guide part.

16. The writing instrument as claimed in claim 15, wherein the guide part is connected to the operating element in a rotationally and axially fixed manner or is a component thereof and the guide channel is arranged in an axially fixed manner in the housing of the writing instrument, or the guide channel is connected to the operating element in a rotationally and axially fixed manner or is a component of the operating element and the guide part is arranged in an axially fixed manner in the housing of the writing instrument.

17. The writing instrument as claimed in claim 15, wherein the guide channel or the guide part is a component of a driver component formed as a sleeve.

18. The writing instrument as claimed in claim 17, further comprising a first spindle body of a spindle arrangement, which interacts with the piston, wherein the spindle arrangement is formed in such a manner that a rotation of the first spindle body brings about an axial movement of the piston, and the driver component, which is formed as a sleeve, sits externally on the first spindle body, which is formed as a sleeve.

* * * * *